Dr. W. O. Reid.
Anti-Friction Box for Axles, Shafting &c.
110160  PATENTED DEC 13 1870
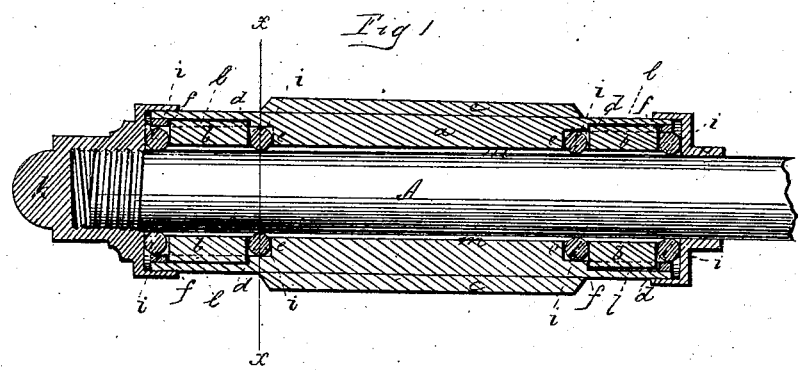
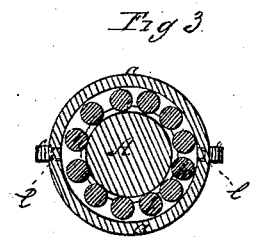
Witnesses  Dr W O Reid Inventor.
by
his Attorneys.

UNITED STATES PATENT OFFICE.

WILLIAM O. REID, OF VIENNA, NORTH CAROLINA.

IMPROVEMENT IN ANTI-FRICTION BOXES FOR AXLES.

Specification forming part of Letters Patent No. 110,160, dated December 13, 1870.

*To all whom it may concern:*

Be it known that I, WILLIAM O. REID, of Vienna, in the county of Forsyth and State of North Carolina, have invented a new and Improved Anti-Friction Box for Axles, Shafting, &c.; and I do hereby declare the following to be a full, clear, and exact description of the same, reference being had to the accompanying drawing, making a part of this specification, in which—

Figure 1 is a longitudinal, and Fig. 2 a transverse vertical, section.

This invention relates to improvements in that class of anti-friction hubs or boxes for wagon-axles, &c., in which the axle rests on balls or rollers, so arranged as to travel around it.

The improvement consists in so constructing and arranging the respective parts that the same balls which sustain the axle-journal shall also prevent friction between the collars and nut of the axle and the ends of the pipe-box.

The invention also contemplates the greatest simplicity of construction and adaptability for adjustment.

In other inventions of this class constructed upon analogous principles there is a greater number of parts and a more complicated and cumbrous arrangement of them, there being also no provision for obviating end friction of the axle-journal, except by a series of balls separate from those on which said journal rests.

In the drawing, A is the axle. *a* is the axle-box; *b b*, the rings, set within the box at each end, and flush with its internal surface, said rings being each provided with two external longitudinal flanges, *e*, projecting from opposite sides, which flanges enter corresponding furrows made for their reception lengthwise of the internal surface of the box, the rings being by this means stayed against pressure exerted endwise. *d d* are the channels between the inner ends of the rings and the shoulders *e e* of the box. *f f* are the channels in the box at the outer ends of the rings. *h* are the balls which occupy the channels *d*. *i* are the balls which occupy the channels *f*. *k* are the nuts; *l l*, the air-spaces between the nuts and box, and *m* the air-space between the axle and box.

It will be observed that both the balls *h* and *i* support the journal, while the latter, being interposed between the taps and rings, reduce the friction resulting from the longitudinal movement of the axle to its minimum.

Having thus described my invention, what I claim as new, and desire to secure by Letters Patent, is—

The arrangement of the flanged rings *b*, balls *h* and *i*, and taps *k* with relation to the flanged and rabbeted pipe-box *a* and the axle-journal, all constructed to operate as and for the purpose specified.

WM. O. REID.

Witnesses:
CHAS. A. PETTIT,
D. OURAND.